(12) United States Patent
Quinn et al.

(10) Patent No.: US 8,163,972 B2
(45) Date of Patent: Apr. 24, 2012

(54) ZERO-VALENT METALLIC TREATMENT SYSTEM AND ITS APPLICATION FOR REMOVAL AND REMEDIATION OF POLYCHLORINATED BIPHENYLS (PCBS)

(75) Inventors: Jacqueline W. Quinn, Titusville, FL (US); Christian A. Clausen, Chuluota, FL (US); Cherie L. Geiger, Geneva, FL (US); Kathleen B. Brooks, Orlando, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 303 days.

(21) Appl. No.: 12/465,457

(22) Filed: May 13, 2009

(65) Prior Publication Data
US 2010/0217063 A1    Aug. 26, 2010

Related U.S. Application Data

(63) Continuation-in-part of application No. 11/462,741, filed on Aug. 7, 2006, now abandoned.

(60) Provisional application No. 61/053,822, filed on May 16, 2008, provisional application No. 60/708,126, filed on Aug. 11, 2005, provisional application No. 60/708,127, filed on Aug. 11, 2005.

(51) Int. Cl.
*A62D 3/30* (2007.01)
*C02F 5/02* (2006.01)
*C02F 5/08* (2006.01)
*B09C 1/08* (2006.01)
*B09C 1/10* (2006.01)
*B09C 1/02* (2006.01)

(52) U.S. Cl. ..... 588/406; 588/313; 252/175; 405/128.5; 405/128.7

(58) Field of Classification Search ........... 588/313, 588/314; 210/198.1; 252/175, 178, 181; 405/128.5, 128.7, 128.75
See application file for complete search history.

(56) References Cited

U.S. PATENT DOCUMENTS

| | | | |
|---|---|---|---|
| 3,986,953 | A | 10/1976 | Beaucaire |
| 4,059,929 | A | 11/1977 | Bishop |
| 4,425,261 | A | 1/1984 | Stenius et al. |

(Continued)

FOREIGN PATENT DOCUMENTS

EP    0409172 A2    1/1991

(Continued)

OTHER PUBLICATIONS

"Permeable Reactive Barrier Update," Environmental Technologies, Inc., May 2000, 4 pages, www.eti.ca.

(Continued)

*Primary Examiner* — Jerry Lorengo
*Assistant Examiner* — Jennifer Smith
(74) *Attorney, Agent, or Firm* — Randall M. Heald; Jennifer P. Yancy

(57) ABSTRACT

PCBs are removed from contaminated media using a treatment system including zero-valent metal particles and an organic hydrogen donating solvent. The treatment system may include a weak acid in order to eliminate the need for a coating of catalytic noble metal on the zero-valent metal particles. If catalyzed zero-valent metal particles are used, the treatment system may include an organic hydrogen donating solvent that is a non-water solvent. The treatment system may be provided as a "paste-like" system that is preferably applied to natural media and ex-situ structures to eliminate PCBs.

45 Claims, 1 Drawing Sheet

U.S. PATENT DOCUMENTS

| | | | |
|---|---|---|---|
| 4,565,635 | A | 1/1986 | Le Du et al. |
| 4,983,217 | A | 1/1991 | Quintela et al. |
| 5,265,674 | A | 11/1993 | Fredrickson et al. |
| 5,266,213 | A | 11/1993 | Gillham |
| 5,278,106 | A | 1/1994 | Nakashima et al. |
| 5,587,157 | A | 12/1996 | Cox et al. |
| 5,615,974 | A | 4/1997 | Land et al. |
| 5,631,044 | A | 5/1997 | Rangaswamy et al. |
| 5,641,425 | A | 6/1997 | McKedy et al. |
| 5,733,067 | A | 3/1998 | Hunt et al. |
| 5,746,937 | A | 5/1998 | McKedy et al. |
| 5,759,389 | A | 6/1998 | Fernando et al. |
| 5,789,649 | A | 8/1998 | Batchelor et al. |
| 5,833,388 | A | 11/1998 | Edwards et al. |
| 5,857,810 | A | 1/1999 | Cantrell et al. |
| 5,868,939 | A | 2/1999 | Oder et al. |
| 5,975,798 | A | 11/1999 | Liskowitz et al. |
| 5,990,365 | A | 11/1999 | Chang et al. |
| 6,013,232 | A | 1/2000 | Quinn et al. |
| 6,039,882 | A | 3/2000 | Wolfe et al. |
| 6,102,621 | A | 8/2000 | Siegrist et al. |
| 6,121,371 | A | 9/2000 | Matyjaszewski et al. |
| 6,190,092 | B1 | 2/2001 | Miller |
| 6,207,114 | B1 | 3/2001 | Quinn et al. |
| 6,217,779 | B1 | 4/2001 | Orth et al. |
| 6,261,029 | B1 | 7/2001 | Miller |
| 6,264,399 | B1 | 7/2001 | Grisso et al. |
| 6,265,205 | B1 | 7/2001 | Hitchens et al. |
| 6,280,533 | B1 | 8/2001 | Hoppe et al. |
| 6,357,968 | B1 | 3/2002 | Dwyer et al. |
| 6,398,960 | B1 | 6/2002 | Borden et al. |
| 6,423,531 | B1 | 7/2002 | Hince et al. |
| 6,558,723 | B2 | 5/2003 | Ekanayake et al. |
| 6,664,298 | B1 | 12/2003 | Reinhart et al. |
| 6,777,449 | B2 | 8/2004 | Vance et al. |
| 7,008,964 | B2 | 3/2006 | Clausen et al. |
| 7,279,590 | B2 | 10/2007 | Inukai et al. |
| 2004/0053050 | A1 | 3/2004 | Guerfi et al. |
| 2005/0208380 | A1 | 9/2005 | Park et al. |

FOREIGN PATENT DOCUMENTS

| | | |
|---|---|---|
| EP | 1508571 A1 | 2/2005 |
| WO | WO0240409 A1 | 5/2002 |

OTHER PUBLICATIONS

Lee and Borden, "Technology Application of Low Cost Emplacement of Insoluble Organic Substrate for Enhanced In Situ Reductive Dechlorination of Halogenated Aliphatic Hydrocarbons," AFCEE, Dover Air Force Base, Delaware, Oct. 28, 1999, 6 pages.

"Emulsified Zero-Valent Iron (EZVI)," Technical Opportunity Sheet, NASA. Released Aug. 2002.

Geiger, et al., "The In Situ Treatment of DNAPL with Zero-Valent Iron Emulsions," The 2001 International Containment & Remediation Technology Conference, 3 pages, presented Jun. 12, 2001.

Morales et al., "Dechlorination of chlorinated phenols by catalyzed and uncatalyzed Fe(0) and Mg(0) particles," Journal of Hazardous Materials B90, 97-108, 2002.

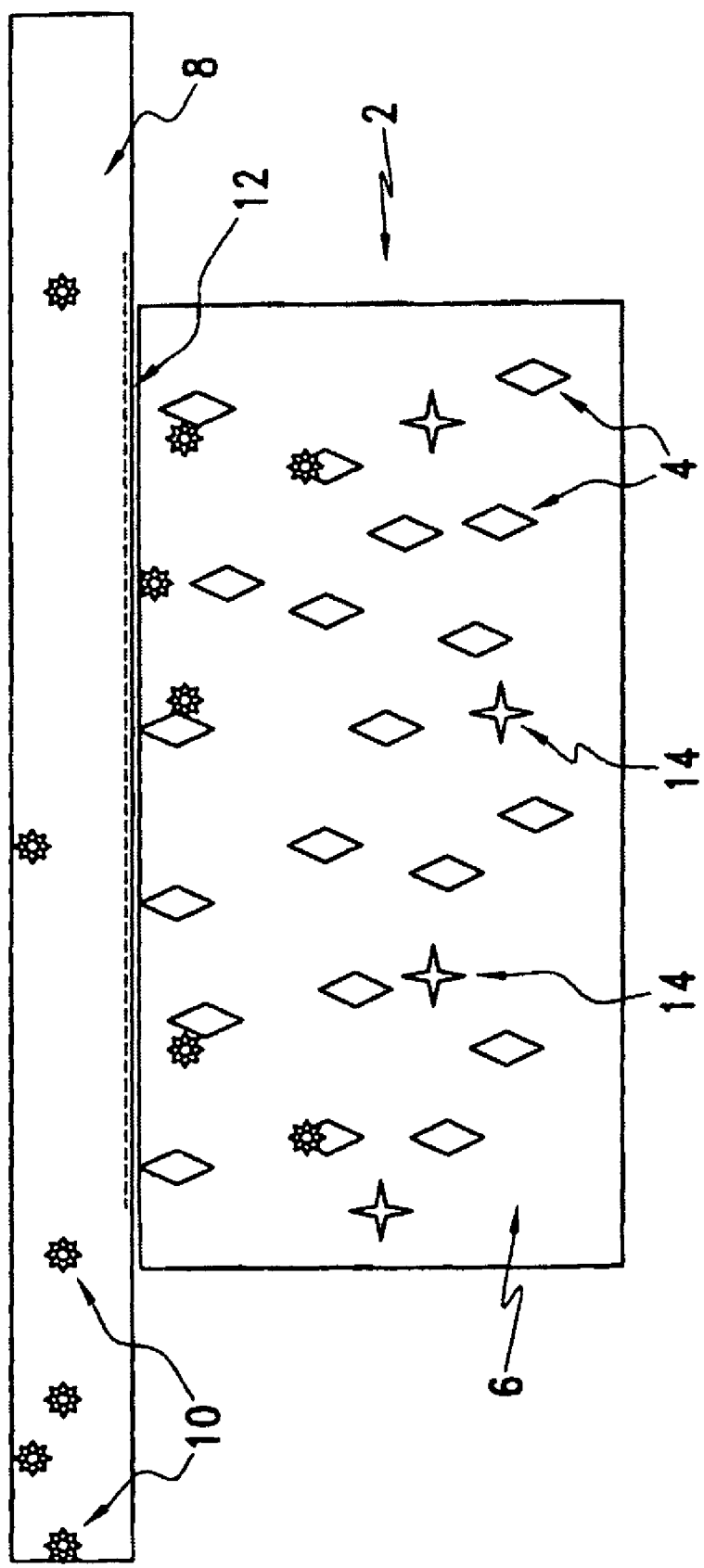

ZERO-VALENT METALLIC TREATMENT SYSTEM AND ITS APPLICATION FOR REMOVAL AND REMEDIATION OF POLYCHLORINATED BIPHENYLS (PCBS)

CROSS-REFERENCE TO RELATED APPLICATIONS

This application is a continuation-in-part application claiming the benefit of U.S. patent application Ser. No. 11/462,741 filed on Aug. 7, 2006, which further claims the benefit under 35 U.S.C. §119(e) of U.S. Provisional Application Ser. No. 60/708,126 filed Aug. 11, 2005, and U.S. Provisional Application Ser. No. 60/708,127 filed on Aug. 11, 2005, the contents of each are incorporated herein by reference. This application also claims the benefit under 35 U.S.C. §119(e) of U.S. Provisional Application Ser. No. 61/053,822 filed on May 16, 2008, the contents of which are incorporated herein by reference.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

BACKGROUND OF THE INVENTION

1. Field of the Invention

The present invention is directed to a treatment system for the remediation of polychlorinated biphenyls (PCBs), chlorinated pesticides, and other halogenated compounds. In one embodiment, the treatment system comprises a plurality of zero-valent metal particles and a hydrogen donating solvent.

2. Description of Related Art

PCBs are a group of synthetic aromatic compounds with the general formula $C_{12}H_{10-x}Cl_x$. PCBs are among the most persistent, bioaccumulative, and toxic compounds and are responsible for the primary risk at numerous sediment sites. PCBs are a group of synthetic aromatic compounds that were historically used in industrial paints, caulking material, and adhesives, as their properties enhanced structural integrity, reduced flammability, and boosted antifungal properties. PCBs have been used in many industrial applications because of their robust physical and chemical properties such as their resistance to acids, bases, and oxidation, their excellent dielectric characteristics, and their thermal stability at high temperatures (up to 350° C.). When PCBs were released into the environment, they were sorbed to particulate matter that was then dispersed over large areas. PCBs can be introduced into the food chain by the uptake of contaminated soils by biota and humans can directly inhale or absorb PCBs by dermal contact.

Although the United States Environmental Protection Agency (USEPA) has banned the manufacture of PCBs since 1979, PCBs are still present in the environment posing possible adverse health affects to both humans and animals. Prior to the USEPA's ban on PCB production, PCBs were commonly used as additives in paints and asphalt-based adhesives that were subsequently applied to a variety of structures. Governmental facilities constructed as early as 1930 utilize PCB-containing binders or PCB-containing paints, which are now leaching into the environment and posing ecological and worker health concerns. PCBs have been found in at least 500 of the 1,598 National Priorities List (Superfund) sites identified by USEPA. Many of the most costly cleanups are at sediment sites dominated by PCB contamination. Additionally, PCBs can still be found in the paints located on NASA property at a number of NASA Centers. The PCB and metal levels in painted structures on Kennedy Space Center have been documented to be as high as 31,000 ppm. PCBs have been introduced into the NASA work environment via improper disposal and accidental leaks from transformers, heat exchanges, and hydraulic systems. Numerous NASA Centers have older metal structures upon which paints containing PCBs were applied. These painted structures are posing worker and ecological health hazards and, in several instances, are now considered a TSCA-level (Toxic Substance Control Act) waste. Some of the impacted structures could be refurbished and utilized for new programs, but because the paint currently on the structures is heavily laden with PCBs, the programs are unable to reuse or even discard these structures without significant cost.

The removal of contaminants from natural resources and structures is an ongoing, significant problem. Because of the serious health problems associated with the bioaccumulation of PCBs in animals, including humans, and the desire for NASA programs to have a quick non-destructive means of removing PCBs from existing structures, numerous tactics have been considered with various degrees of success. Recent research and development work at NASA Kennedy Space Center has led to the development of a reagent comprised of elemental magnesium coated with a small amount of palladium that can be incorporated into a solvent matrix treatment system. Researchers demonstrated rapid and complete dechlorination in aqueous/solvent systems containing chlorinated materials. Additional research has shown that the application of a bimetallic treatment system leads to both the extraction of PCBs from weathered coatings and their ultimate degradation. However, the noble metal palladium coating includes additional processing steps and the palladium material itself provides significant additional costs to the overall treatment system.

In the invention disclosed in U.S. Pat. No. 6,664,298, issued on Dec. 16, 2003, and incorporated into the present application by express reference thereto, a method was disclosed for delivering a reactive material to a contaminant in situ. The method incorporated the concept of either emulsification of the reactant or encapsulation of the reactant prior to its delivery to the contaminant in situ. The method disclosed and claimed in U.S. Pat. No. 6,664,298 has particular success in using a zero-valent metal emulsion containing metal particles, surfactant, oil, and water in a method of enhancing dehalogenation of dense non-aqueous phase liquid (DNAPL) sources. While it is known that zero-valent iron is very effective in the treatment of chlorinated hydrocarbons, such as dissolved trichloroethylene (TCE), zero-valent iron, by itself, is unable to completely dechlorinate PCBs or more robust halogenated compounds such as chlorinated pesticides dissolved in aqueous solutions.

In the invention disclosed in U.S. Pat. No. 7,008,964, issued on Mar. 7, 2006, and incorporated into the present application by express reference thereto, another emulsion system for remediating contaminated media is disclosed. A zero-valent metal emulsion containing zero-valent metal particles doped with a catalytic metal is disclosed to remediate halogenated aromatic compounds, such as PCBs, from natural resources, i.e., in the ground. However, this option for the removal of PCBs found in natural media using an emulsion has several limitations. This emulsion includes emulsion particles comprised of an aqueous interior with bimetal particles encapsulated in a surfactant stabilized hydrophobic solvent membrane. The use of a water-only solvent interior continuum has several disadvantages. Most importantly, making the aqueous-based emulsion requires the potentially hazardous step of adding pure water to the catalytic metal coated zero-valent metal particle. This step is particularly hazardous because:

1. This step produces significant amounts of hydrogen gas which is flammable.
2. The metal particles are so small and light that they produce a dust cloud of catalyzed particles in air when mixed with water. Because of the large surface area of the catalyzed particles, this dust cloud is a potential explosion hazard.
3. The reaction itself is exothermic producing heat that is inherently dangerous in the presence of hydrogen gas.
4. Catalytic metals, such as palladium, within a bimetal particle when mixed with hydrogen gas have the unique ability to produce atomic hydrogen at the metal surface which is extremely reactive. The addition of atomic hydrogen with any of the hazards previously listed increases the likelihood of unexpected explosions or fire.

Along with the significant hazards associated with the production of the previous emulsion, the reaction of the bimetal particle with water itself is a competing reaction that affects the dehalogenation of PCBs. Recent laboratory studies have shown that when excess water is in the presence of the bimetal particle for a significant amount of time (greater than 24 hours) before exposure to the PCBs, the PCBs degradation is hindered. This is due to the water depleting the zero-valent metal particle which supplied necessary electrons to the dehalogenation reaction. While the bimetallic particles have been shown to effectively degrade dissolved phase PCBs, the use of bimetallic particles to treat impregnated PCBs would be minimized by the coating material itself.

BRIEF SUMMARY OF THE INVENTION

The present invention is directed to a treatment system comprising a plurality of zero-valent metal particles and an organic hydrogen donating solvent. In one embodiment, the zero-valent metal particles are coated with a catalytic metal and the solvent is a non-water solvent. In another embodiment, the treatment system comprises a plurality of zero-valent metal particles, a weak acid, and an organic hydrogen donating solvent. This second treatment system is beneficial because it does not require the addition of a noble metal coating to the metal particles. Unlike previous bimetallic treatment systems, the second system dispenses with costly catalytic material while achieving the same results of creating a treatment system adaptable to removing PCBs from contaminated media. Since these treatment systems provide for the destruction of PCBs, they offer a great benefit, as only PCB destruction can eliminate future liabilities. The treatment system may be formulated into a "paste-like" system that is preferably applied to natural media and ex-situ structures. As will become clear, the present invention expands on the concept described in the previously cited patents to effectively remove and remediate PCBs and other halogenated compounds such as chlorinated pesticides found in natural media, painted structures, and other ex-situ facilities.

In a first embodiment, the treatment system is used for the in-situ remediation of PCBs, chlorinated pesticides, and other halogenated compounds found in natural media including groundwater, surface water, sediment, and soil. The treatment system has the advantage that it does not negatively alter the natural media, allowing the contaminant to be treated in situ without costly dredging, therefore decreasing the impact of cleanup. Additionally, the treatment system provides no hazardous by-products, which eliminates long-term environmental liabilities, minimizes the potential of leaching or spreading hazardous waste into the environment, and eliminates costly hazardous waste disposal costs.

In a second embodiment, the treatment system is used for the removal and destruction of PCBs found in ex-situ structures, such as painted structures, or within the binding or caulking material on ex-situ structures. The treatment system could be very beneficial to entities responsible for PCB-laden structures and other PCB contamination problems. Not only are these structures a demolition hazard, they are allowing constant leaching of PCBs into surrounding soils and other natural media. Sites containing PCBs in their structures include the U.S. Navy, Army, utility companies, etc. The present invention provides an in-situ PCB remediation process that is applicable for the treatment of ex-situ structures containing metal and PCB compounds within externally applied coatings such as paint. The treatment system extracts and degrades only the PCBs found in the structure, leaving in most cases the structure virtually unaltered. The present treatment system as applied to ex-situ structures functions to disassociate the PCBs from the coating, i.e. paint, and degrades the chlorinated aromatics into biphenyl, a benign by-product. The treatment system may be applied using a "paint-on and wipe-off" process, that in the end leaves the structure PCB-free and virtually unaltered in physical form. The treatment system may also be applied utilizing dip tanks where pieces of caulking or adhesives are treated in batches prior to non-TSCA regulated disposal. The present treatment system has far reaching implications to older facilities across the world; allowing them to be remediated and reused by implementing a PCB cleanup technology that removes and degrades the PCBs while on the structure.

BRIEF DESCRIPTION OF THE DRAWING

The features and advantages of the present invention will become apparent from the following detailed description of a preferred embodiment thereof, taken in conjunction with the accompanying drawing, in which:

FIG. 1 is a diagram of a preferred use of the present treatment system on a contaminated structure.

DETAILED DESCRIPTION OF THE INVENTION

The present invention is directed to a treatment system comprising a plurality of zero-valent metal particles and an organic hydrogen donating solvent. Preferably, the organic hydrogen donating solvent contains one or more hydroxyl groups. In one embodiment, the zero-valent metal particles are catalyzed zero-valent metal particles and the organic hydrogen donating solvent is a non-water solvent. The catalyzed zero-valent metal particles are zero-valent metal particles coated with a catalytic metal. The catalytic metal may be a noble metal selected from the group consisting of palladium, nickel, zinc, and mixtures thereof. In a second embodiment, the treatment system comprising a plurality of zero-valent metal particles, a weak acid, and an organic hydrogen donating solvent. A weak acid is an acid with a PKa value of greater than 2. The weak acid may be selected from, but not limited to, the following weak acids and mixtures thereof: glacial acetic acid, formic acid, propionic acid, lactic acid, and/or other carboxylic acid or aromatic acids. The reference to "an organic hydrogen donating solvent" should be construed to include solvents that only include organic compounds as well as solvents that include organic compounds and non-organic compounds, such as water. One embodiment of the organic hydrogen donating solvents includes, but is not limited to, alcohols. More specifically, one embodiment of the organic hydrogen donating solvent includes, but is not limited to, alcohols such as diols, triols, ethanol, methanol, and mixtures thereof. Except as indicated above, any of these organic compounds may also be preferably mixed with water to form the organic hydrogen donating solvent. In one embodiment, the zero-valent metal particles contain zero-valent iron (Fe) or zero-valent magnesium (Mg). In another embodiment, the zero-valent metal particles are microscale or nanoscale zero-valent magnesium or zero-valent iron particles. Preferably, the microscale particles would have a diameter in the range of 1-3 microns. Whereas, the preferred nanoscale particles would have a diameter in the range of 20-300 nm. It should be understood that other zero-valent metal particles and combinations may be used. One advantage of the treatment system having a weak acid present is that no additional catalytic material, such as a noble metal, needs to be coated on the zero-valent metal particles in order to promote the dehalogenation of the PCBs.

In one embodiment, the treatment system is formulated as a "paste-like" system that contains the zero-valent metal particles, weak acid, and the organic hydrogen donating solvent within a thickener and a stabilizing agent. In a preferred embodiment, a "paste-like" system is formed by coating the zero-valent metal particles with glycerin in an ethanol/glacial acetic acid solution with calcium stearate added as a thickener. Other thickeners may be added including, but not limited to, PEG, glycerin, paraffin, stearate, and mixtures thereof. In this preferred embodiment, glycerin is used as a stabilizing agent. However, other stabilizing agents include, but are not limited to, mineral oil, vegetable oil, or mixtures thereof. In this preferred embodiment, calcium stearate is used as the thickener. However, in another embodiment the thickener may also be a starch.

The treatment system is used to treat PCB or other halogenated compounds to degrade the PCB into a benign end-product. It should be understood that any reference to PCBs in the present application also expressly includes a reference to other suitable halogenated compounds, including, but not limited to, Chlordane and DDT. Once in contact with contaminated media, the PCBs diffuse into the treatment system and undergo degradation. The PCBs continue to enter, diffuse, and degrade into non-halogenated end-products. The present treatment system has found particular use in remediating PCB-containing natural media and ex-situ structures.

In a first embodiment, the treatment system is applied to natural media. The treatment system causes the PCB to be extracted or removed from the media (e.g. soil or sediment), and degrades the chlorinated aromatics into biphenyl or other non-chlorinated benign by-products. In a preferred embodiment used in treating natural media, the treatment system comprises zero-valent magnesium (Mg) particles utilized in conjunction with a weak acid, and an organic hydrogen donating solvent, preferably alcohols and water. The treatment system has two functions in remediating sediments: first, to adsorb the PCBs from the soil matrix; second, to degrade the extracted PCBs. The process for sorbing the PCB molecules from the inorganic or organic external soil or humic particles to the treatment system is aided by the incorporation of a lipophilic earth-friendly solvent, preferably ethanol, corn oil, or limonene, within the treatment system. This lipophilic compound will draw the hydrophobic PCB molecules into the treatment system via solvation. The second process is the degradation or dehalogenation of the PCBs. The organic hydrogen donating solvent selected for this process is limited to organic solvents that are capable of donating a hydrogen atom to the PCB structure. Organic hydrogen donating solvents with this ability include, but are not limited to, organic solvents containing one or more hydroxyl groups (e.g. alcohols) such as methanol, ethanol, and glycerin. This hydrogen atom, as will be described in more detail below, replaces the chlorine atom on the biphenyl ring. Organic hydrogen donating solvents with hydroxyl groups, preferably methanol, ethanol, and glycerin, in the absence of water have been shown to be as effective in the dehalogenation process as pure water. Additionally, the use of an organic hydrogen donating solvent without water allows the treatment system to be effective over extended periods of time. The previous water-only containing emulsion lost its efficacy within 24 hours after being manufactured. This, as stated earlier, is due to the competing reaction of water and magnesium that leaves oxidized magnesium that is incapable of providing the necessary electrons for the dehalogenation process. The present treatment system is a potent hydrodechlorination reagent capable of removing the chlorine from high concentration solutions of chlorocarbons in minutes. The degradation end-product for the dehalogenation of all Arochlor mixtures is the biphenyl ring, which is a benign end-product. Magnesium metal, a powerful reducing agent, reacts with water to form hydrogen gas ($H_2$) and magnesium hydroxide. It is hypothesized that the interaction of the zero-valent metal particles in conjunction with a weak acid with a solvent containing available hydrogen moieties (i.e. alcohols or water) results in the generation of atomic hydrogen at particular sites on the metal surface. The bound, atomic hydrogen is available for reaction with PCB molecules in solution yielding a reductive dehalogenation reaction. The proposed reaction mechanism is shown below:

$$Mg+2H_2O \rightarrow Mg(OH)_2+H_2$$

$$H_2+RCl \rightarrow RH+HCl$$

Rapid and almost complete dechlorination of PCBs in aqueous/solvent systems in the presence of the catalyst system described above was demonstrated.

In a preferred embodiment, a mixing device can be used to mix the treatment system into the sediment or it may be pumped into a matrix of concern. The preferred treatment system includes zero-valent magnesium (Mg) particles that react with PCBs during and after mixing over a period of minutes to days, and may either remain in the sediment or be recovered. Introduction of the zero-valent magnesium particles may be as a bare metal or in a biodegradable solvent reagent paste, which has the dual benefit of stripping strongly bound PCBs into the solvent phase and controlling the rapid oxidation of Mg in water. Alternatively, the zero-valent metal particle, preferably zero-valent Mg, may be coated with a small amount of a stabilizing agent, such as oil or glycerin, and inserted into the sediment. The oil is preferably a vegetable or mineral oil. However, this method of remediating PCBs may have some disadvantages. The zero-valent Mg particles may become ineffective shortly after the oil is removed from the surface of the zero-valent Mg particle through natural degradation of the oil in the sediment. Recovery of the zero-valent Mg particles may be possible by introducing the treatment system on a magnetic support like iron particles. This treatment system may be used in combination with others, such as placement of a thin layer cap to minimize subsequent resuspension, or amendment of the benthic layer with a sequestration agent such as activated carbon to treat residuals. This treatment system may be used to dechlorinate PCBs in riverine and estuarine sediment in situ or ex situ. The reaction is allowed to proceed over a period of minutes to days.

In a second embodiment, the treatment system is applied to ex-situ structures and causes the PCBs to disassociate from the coating, i.e., paint, and the chlorinated aromatics are degraded to biphenyl, the benign by-product. Once the treatment system is in contact with a contaminated structure, the paint softens allowing the PCBs to diffuse into the treatment system and undergo degradation. The PCBs continue to enter, diffuse, and degrade into non-halogenated end-products. FIG. 1 illustrates the manner by which one embodiment of the present invention may be used to treat an ex-situ structure. The treatment system 2 including reactive zero-valent metal particles 4 in a solvent system 6 degrades a painted structure 8 containing PCBs 10. The treatment system 2 softens the paint at the contact area 12. The PCBs are disassociated from the painted structure 8 and non-chlorinated by-products 14 are contained within the treatment system. Additionally, a second solvent, such as d-limonene, toluene or hexane, may be used in the treatment system as applied to ex-situ structures in order to soften the paint.

In a preferred embodiment, PCBs may be removed from painted structures using the present treatment system. The treatment system has two primary functions: 1) to extract the PCBs from 40 year old material; and 2) to degrade the extracted PCBs. The process for removing PCBs from structures is accomplished as an independent step to the degradation process. The goal is to extract the PCBs out of the paint without destroying the paint and partition the PCBs into an environmentally friendly solvent. Research has indicated that this step can usually be accomplished within the first 24 hours of the treatment system contacting the paint. PCBs are extremely hydrophobic and prefer to be in the treatment system over hardened paint or binder material. The solvent selected for the treatment system must be used to open, but not destroy, the paint's polymeric lattice structure, allowing pathways for PCB movement out of the paint and into the solvent. A number of solvents are available for use within the treatment system including, but not limited to ethanol, methanol, d-limonine, acetone, and other primary alcohols and ketones. The second process is the degradation or dehalogenation of the PCBs. The solvent selection for this process is limited to organic hydrogen donating solvents that are capable of donating a hydrogen atom to the PCB structure. Organic hydrogen donating solvents with this ability include, but are not limited to, solvents containing one or more hydroxyl groups (alcohols) such as methanol, ethanol, and glycerin.

The following Experiment Results are used to illustrate the beneficial results that are obtained using the present treatment system. However, it should be understood by one of ordinary skill in the art that the treatment system may be modified from these preferred embodiments without departing from the scope of the present invention.

Experimental Results

A number of experiments were set up to test the reactivity of zero-valent Mg particles in ethanol with glacial acetic acid. The results for one such test are presented below. The experiment consisted of adding 0.5 mg of zero-valent Mg particles to a glass vial containing 9.9 ml of ethanol and 0.1 ml of glacial acetic acid. To duplicates of these vials, 0.1 µl of 10,000 ppm Aroclor 1254 was added. The vials were allowed to sit from two to six days before extraction. A control was also set up in duplicate where no glacial acetic acid was added to the system. The results from the Gas Chromatography (GC) analysis are presented in Table 1, where seven peaks are identified as part of the GC analysis. These seven peaks represent different congeners found in a given Aroclor. They range from tetrachloro to pentachloro to hexachloro congeners in Aroclor 1254 and they represent the most abundant mass ions visible in the 1254 spectrum. Using these peaks, standards of a known concentration are run on the GC to provide a calibration curve for determining the concentration of the samples being evaluated for PCB destruction.

TABLE 1

| Vial | biphenyl | peak 1 | peak 2 | peak 3 | peak 4 | peak 5 | peak 6 | peak 7 | Avg peak concentration |
|---|---|---|---|---|---|---|---|---|---|
| Standard 10 ppm 1254 | 9.68 | 9.54 | 9.58 | 9.90 | 10.29 | 10.67 | 9.94 | 10.25 | 10.02 |
| Standard 50 ppm 1254 | 50.42 | 50.84 | 50.75 | 50.14 | 49.47 | 49.33 | 49.96 | 49.52 | 50.00 |
| Standard 100 ppm 1254 | 99.70 | 99.63 | 99.66 | 99.74 | 100.23 | 100.54 | 100.00 | 100.19 | 100.00 |
| Mg w/o HAc Vial 1, 2 day Exposure | 1.64 | 90.39 | 92.27 | 91.81 | 94.30 | 96.58 | 96.59 | 102.00 | 94.85 |
| Mg w/o HAc Vial 2, 2 day exposure | 1.63 | 89.82 | 92.99 | 92.64 | 94.99 | 98.74 | 97.71 | 103.59 | 95.78 |
| Mg w/ HAc Vial 1, 2 day exposure | 131.39 | 5.66 | 2.76 | 2.12 | 2.85 | 4.11 | 2.21 | 3.09 | 3.26 |
| Mg w/ HAc Vial 2, 2 day exposure | 141.94 | 2.53 | 1.67 | 1.82 | 2.70 | 3.72 | 2.56 | 2.88 | 2.55 |
| Mg w/o HAc Vial 1, 6 day exposure | 1.45 | 68.14 | 69.51 | 70.63 | 73.84 | 79.94 | 75.59 | 81.74 | 73.29 |
| Mg w/o HAc Vial 2, 6 day exposure | 1.48 | 66.57 | 69.07 | 68.98 | 72.26 | 79.12 | 75.52 | 81.50 | 2.67 |
| Mg w/ HAc Vial 1, 6 day exposure | 129.68 | 2.84 | 1.86 | 2.02 | 2.78 | 3.99 | 2.28 | 2.94 | 2.31 |

TABLE 1-continued

| Vial | biphenyl | peak 1 | peak 2 | peak 3 | peak 4 | peak 5 | peak 6 | peak 7 | Avg peak concentration |
|---|---|---|---|---|---|---|---|---|---|
| Mg w/ HAc Vial 2, 6 day exposure | 147.86 | 1.22 | 1.62 | 1.53 | 3.02 | 3.72 | 2.17 | 2.86 | 10.02 |

Although the present invention has been disclosed in terms of a number of preferred embodiments, it will be understood that numerous modifications and variations could be made thereto without departing from the scope of the invention as defined by the following claims:

We claim:

1. A treatment system comprising:
a plurality of zero-valent metal particles, wherein said zero-valent metal particles do not include a coating of a catalytic noble metal;
a weak acid; and
an organic hydrogen donating solvent in the absence of water, whereby said treatment system is capable of remediating a halogenated compound.

2. The treatment system of claim 1, wherein said organic hydrogen donating solvent is an alcohol.

3. The treatment system of claim 2, wherein said alcohol is selected from the group consisting of a diol, a triol, methanol, ethanol, glycerin, and mixtures thereof.

4. The treatment system of claim 1, further comprising a second solvent.

5. The treatment system of claim 4, wherein said second solvent is selected from the group consisting of d-limonene, toluene, hexane, and mixtures thereof.

6. The treatment system of claim 1, further comprising a thickener.

7. The treatment system of claim 6, wherein said thickener is calcium stearate or a starch.

8. The treatment system of claim 1, further comprising a stabilizer.

9. The treatment system of claim 8, wherein said stabilizer is selected from the group consisting of glycerin, mineral oil, vegetable oil, polyethylene glycol, and mixtures thereof.

10. The treatment system of claim 8, further comprising a thickener.

11. The treatment system of claim 1, wherein said plurality of zero-valent metal particles are zero-valent magnesium particles or zero-valent iron particles.

12. The treatment system of claim 1, wherein said weak acid is an acid with a PKa value of greater than 2.

13. The treatment system of claim 12, wherein said weak acid is selected from the group consisting of glacial acetic acid, formic acid, propionic acid, lactic acid, carboxylic acid, aromatic acids, and mixtures thereof.

14. A treatment system comprising:
a plurality of catalyzed zero-valent metal particles; and
an organic hydrogen donating solvent in the absence of water, wherein said solvent is a non-water solvent.

15. The treatment system of claim 14, wherein said organic hydrogen donating solvent is an alcohol.

16. The treatment system of claim 15, wherein said alcohol is selected from the group consisting of a diol, a triol, methanol, ethanol, glycerin, and mixtures thereof.

17. The treatment system of claim 14, further comprising a second solvent.

18. The treatment system of claim 17, wherein said second solvent is selected from the group consisting of d-limonene, toluene, hexane, and mixtures thereof.

19. The treatment system of claim 14, further comprising a thickener.

20. The treatment system of claim 19, wherein said thickener is a calcium stearate or a starch.

21. The treatment system of claim 14, wherein said zero-valent metal particles are coated with a stabilizer.

22. The treatment system of claim 21, wherein said stabilizer is selected from the group consisting of glycerin, mineral oil, vegetable oil, and mixtures thereof.

23. The treatment system of claim 14, further comprising a thickener and a stabilizer.

24. The treatment system of claim 14, wherein said plurality of catalyzed zero-valent metal particles includes a plurality of zero-valent metal particles coated with a catalytic metal.

25. The treatment system of claim 24, wherein said plurality of zero-valent metal particles are zero-valent magnesium particles or zero-valent iron particles.

26. The treatment system of claim 25, wherein said catalytic metal is a noble metal.

27. The treatment system of claim 26, wherein said noble metal is selected from the group consisting of palladium, nickel, zinc, and mixtures thereof.

28. The treatment system of claim 24, wherein said catalytic metal is a noble metal.

29. The treatment system of claim 28, wherein said noble metal is selected from the group consisting of palladium, nickel, zinc, and mixtures thereof.

30. The treatment system of claim 14, whereby said treatment system is capable of remediating a halogenated compound.

31. A treatment system comprising:
a plurality of zero-valent metal particles coated with a stabilizer; and
an organic hydrogen donating solvent in the absence of water, wherein said solvent contains one or more hydroxyl groups.

32. The treatment system of claim 31, wherein said plurality of zero-valent metal particles include a plurality of zero-valent metal particles coated with a catalytic metal.

33. The treatment system of claim 32, wherein said catalytic metal is a noble metal.

34. The treatment system of claim 31, wherein said organic hydrogen donating solvent is an alcohol.

35. The treatment system of claim 34, wherein said alcohol is selected from the group consisting of a diol, a triol, methanol, ethanol, and mixtures thereof.

36. The treatment system of claim 31, wherein said organic hydrogen donating solvent is a non-water solvent.

37. The treatment system of claim 31, further comprising a weak acid.

38. The treatment system of claim 37, wherein said weak acid is an acid with a PKa value of greater than 2.

39. The treatment system of claim 38, wherein said weak acid is selected from the group consisting of glacial acetic acid, formic acid, propionic acid, lactic acid, carboxylic acid, aromatic acids, and mixtures thereof.

40. The treatment system of claim 37, wherein said zero-valent metal particles do not include a coating of a catalytic noble metal.

41. The treatment system of claim 31, further comprising a thickener.

42. The treatment system of claim 41, wherein said thickener is calcium stearate or a starch.

43. The treatment system of claim 31, wherein said stabilizer is selected from the group consisting of glycerin, mineral oil, vegetable oil, and mixtures thereof.

44. The treatment system of claim 31, wherein said plurality of zero-valent metal particles are zero-valent magnesium particles or zero-valent iron particles.

45. The treatment system of claim 31, whereby said treatment system is capable of remediating a halogenated compound.

* * * * *